United States Patent [19]

Milly

[11] Patent Number: 4,589,798

[45] Date of Patent: May 20, 1986

[54] DRAINAGE SYSTEM

[76] Inventor: John J. Milly, 2425 Island View Dr., Panama City, Fla. 32405

[21] Appl. No.: 616,673

[22] Filed: Jun. 4, 1984

[51] Int. Cl.$^4$ ........................ B01D 21/10; E02B 13/00
[52] U.S. Cl. ......................................... 405/36; 405/52; 210/164
[58] Field of Search .............................. 405/36, 39–43, 405/45, 48, 52; 210/163, 164, 165, 170

[56] References Cited

U.S. PATENT DOCUMENTS

| | | | |
|---|---|---|---|
| 2,701,027 | 2/1955 | Scoville | 210/163 |
| 3,501,007 | 3/1970 | Davis | 405/36 X |
| 3,626,823 | 12/1971 | Toth | 405/36 X |
| 4,031,009 | 6/1977 | Hicks | 405/36 X |

*Primary Examiner*—Dennis L. Taylor
*Attorney, Agent, or Firm*—C. A. Phillips

[57] ABSTRACT

A drainage system for disbursing water supplied by a drain pipe including an enclosure positionable in water permeable material, its top edge generally flush with terrain, and said enclosure having a generally perforated top, an opening in the bottom and an opening in a side wall. Water received by the enclosure through an opening in the side wall and is generally spread and thereby gradually dispersed around the enclosure and residual water in the enclosure is gradually leaked off through the opening in the bottom.

9 Claims, 4 Drawing Figures

DRAINAGE SYSTEM

TECHNICAL FIELD

This invention relates generally to drainage systems, and particularly to one adapted to provide more effective dispersion of water drained off of a building through a drainage pipe and to facilitate lawn maintenance.

BACKGROUND OF THE INVENTION

It is a general practice to provide gutter pipes around the roof of a building, particularly residential dwellings, and to provide a drain or down pipe, typically at a corner of the dwelling, which carries the water downward from a gutter to the ground. The down pipe typically turns outward and terminates a few inches above ground. Water flowing downward through the pipe during a rain is thus directed from the pipe, and with some velocity, onto an area immediate to the dwelling and its foundation. This obviously creates a condition wherein the ground erodes, creating a gully or gullies around the foundation, which is clearly undesirable. In order to prevent this, various devices have been employed to carry the water away from the edge of a building. The typical device employed is what is termed a splash block which is simply an elongated trough or channel and normally made of concrete. A splash block is not a good solution to the problem for two reasons. One, it simply moves the impact of the flow of rain water a bit further from the house. The erosion problem is not greatly eliminated but is simply moved to a different place. Second, splash blocks, being above ground, must be moved in order to effectively work on the lawn around them, as to cut grass. If not moved, one must manually trim grass around the block to effect a neat lawn. Being concrete, they are typically quite heavy, being on the order of 50 pounds and are thus difficult to handle.

It is the object of this invention to solve both of the problems referred to, eliminating horizontal water direction and velocity, and at the same time doing it by means that do not get in one's way, thus simplifying lawn maintenance.

SUMMARY OF THE INVENTION

In accordance with this invention, a drainage down pipe is extended below the level of a lawn to a drainage enclosure which is positioned below the level of the lawn and desirably in water permeable material. A residential unit enclosure is typically $4\frac{1}{2}''$ in depth and has a volume of approximately 400 cubic inches. Commercial units are somewhat larger. There is an opening in a side wall of the enclosure to which the down pipe is connected via an L-shaped end region of the down pipe. The side walls of the enclosure extend upward to essentially terrain level, and the enclosure is covered by a top plate which is vertically and laterally supported on the side walls. It is constructed such that water supplied to the enclosure through the down pipe arises up through openings in or around the top cover. The open region is substantially distributed such that the volume of water reaching any point around the enclosure is relatively small. The area of this open region is greater than the area of the down spout, thus reducing the velocity of the water.

DETAILED DESCRIPTION OF THE DRAWINGS

Figure 1:
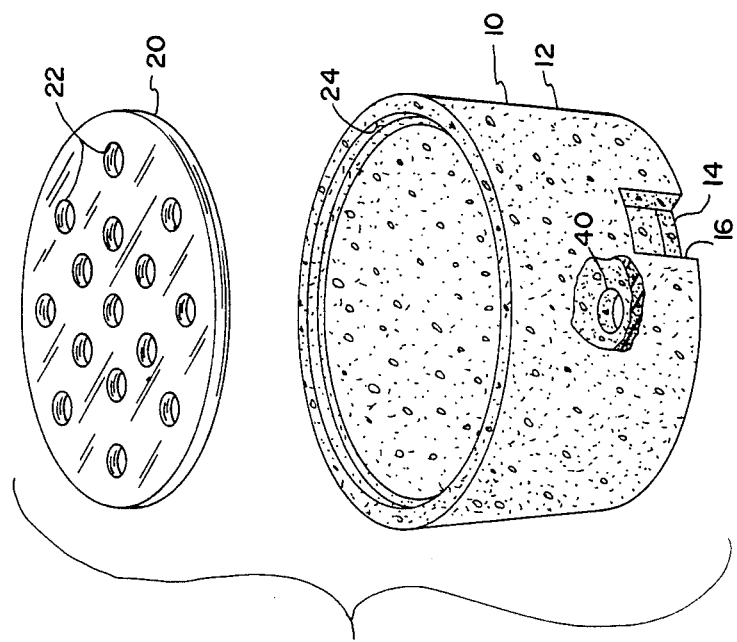
FIG. 1 is a pictorial view of a drainage enclosure as contemplated by this invention.
Figure 2:
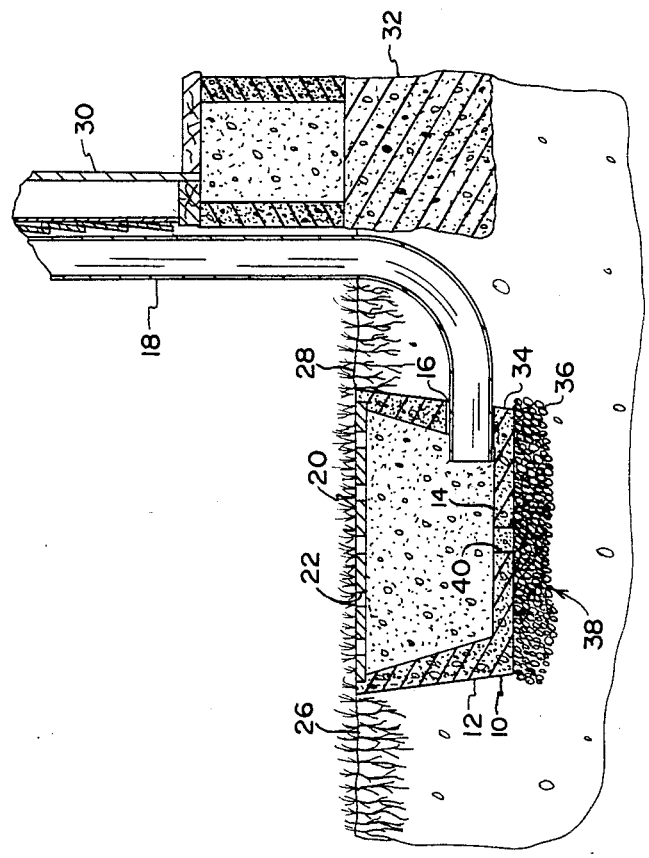
FIG. 2 is a side view, partially cut away, of an installed drainage system as contemplated by this invention.

Referring initially to FIG. 1, enclosure 10 is circular in construction having a circular side wall 12 and base 14. An opening 16 is formed in side wall 12 and is sized to accept a drain down pipe 18, as shown in FIG. 2. Typically, enclosure 10 would be constructed of concrete but, of course, can be constructed of other materials, such as a synthetic plastic material. A cover 20 having openings 22 is adapted to fit over the top of enclosure 10, and it is laterally locked to enclosure 10 by virtue of an annular recess 24 into which cover 20 fits. This cover may be of various materials, such as plastic or perforated steel plate. As shown in FIG. 2, enclosure 10 is positioned below the level of terrain 26 and within a filler material 28, which may be earth. Drain pipe 18, typically attached to a building 30 which rests on a foundation 32, extends down into the filler material and into opening 16 of enclosure 10. Typically, the horizontal distance from the vertical portion of down pipe 18 to the near edge 34 of enclosure 10 is on the order of 1' to 3'. It is desirable that enclosure 10 rest in a particularly water permeable or porous material, such as sand or gravel material 36 of region 38. An opening 40 in the bottom of enclosure 10 enables the ultimate drainage of the enclosure. The opening would typically cover 1 to 3 square inches.

Upon the occurrence of a rain, there will be flow of water down through down pipe 18 into enclosure. When it fills, water will percolate up through the openings 22 in cover 20. The direction of water pressure is upward. Thereafter, it falls back and moves outward around the periphery of cover 20, with significantly less force and concentration, greatly diminishing possible erosion effects. This follows since typically, the cross-sectional area of pipe 18 would be 7 to 8 square inches, whereby the total enclosure openings are typically 14 to 20 square inches.

At the same time, some water initially moves downward through opening 40 into the region 38 under base 14 which, as shown, is particularly filled with a porous fill material 36. This enables the liquid to generally be spread over an area equivalent to the base, or larger area if the porous fill extends beyond the base. The final rate of discharge, of course, depends upon the permeability of the soil below material 36. In any event, the purpose of opening 40 is simply to enable a final emptying of enclosure 10 and thus prevent water from standing in the enclosure, which might be a breeding place for mosquitoes.

Figure 3:
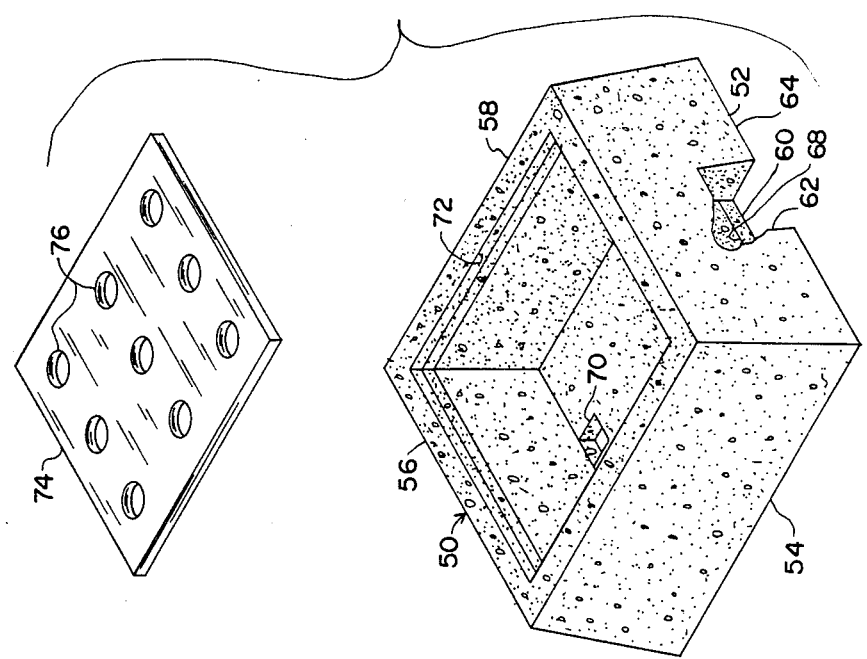
FIG. 3 is a pictorial view of a second embodiment of an enclosure for the drainage system contemplated by this invention.

FIG. 3 illustrates a rectangular enclosure 50, typically made of concrete, or it may be made of other material as described above. Enclosure 50 has four generally sloping walls 52, 54, 56, and 58 which extend upward from a base 60. An entrance opening 62 is formed in one side 52, and this opening extends to the outer bottom side 64 of enclosure 50 and wherein the thickness of base 60 extends upward from the bottom side 64 and terminating at top side 68. Opening 70 in base 60 provides for drainage of the enclosure. Recess 72 in the top edge region of enclosure 50 is adapted to receive, and vertically and laterally support, rectangular top plate or cover 74. Cover 74 includes a series of round (or other shaped) holes or openings 76. Its employment is as described above for a cover shown in FIGS. 1 and 2.

Figure 4:
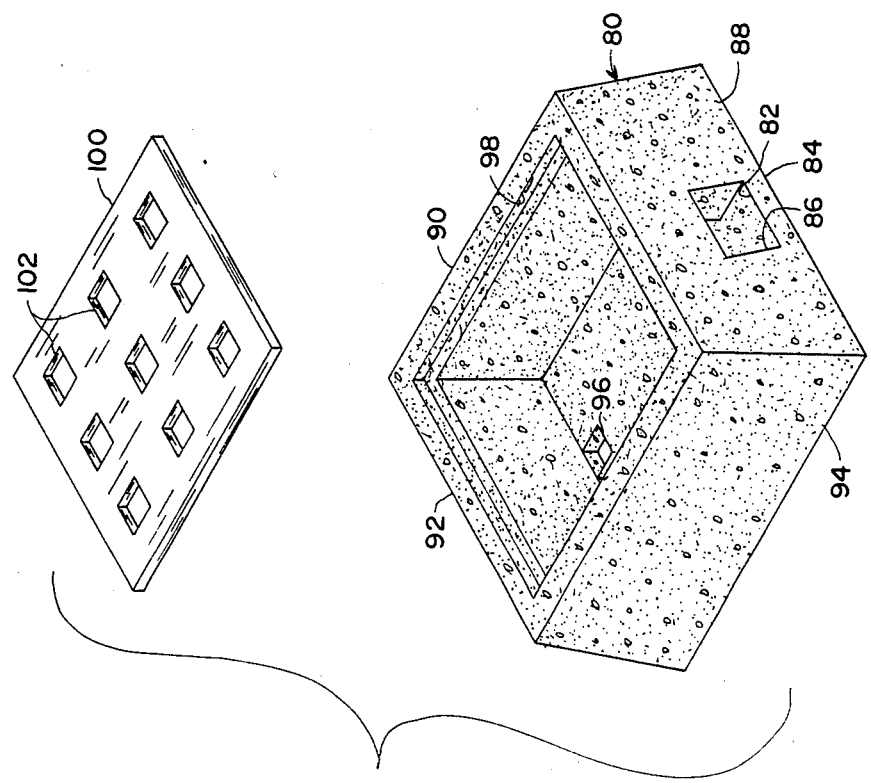
FIG. 4 is a pictorial view of still another drainage enclosure for the drainage system contemplated by this invention.

The embodiment shown in FIG. 4 illustrates still another enclosure, enclosure 80, it differing from the one shown in FIG. 3 in that the inner or top side 82 of base 84 forms the bottom of down pipe opening 86. Otherwise, enclosure 80, having sides 88, 90, 92, and 94 and opening 96, is like counterparts shown in FIG. 3. Thus, recess 98, like recess 72 of FIG. 3, located in the top region of the side walls, is adapted to receive and laterally support top plate or cover 100. Top plate 100, which may employed also with the embodiment shown in FIG. 3, illustrates square holes 102 in it rather than round holes as shown in FIG. 3. The top plates may be configured of heavy wire mesh, stretched steel, steel bars, or other supportive material.

The top plates or covers may be still differently configured, for example, instead of having distinct openings, the size of the top plate may be otherwise reduced in solid area so that liquid may flow upward around portions of it. Typically, the closed area would be from 20% to 60% of the total opening of the enclosure without cover. In such cases, the recesses may be reduced in supporting area.

From the foregoing, it is to be appreciated that the applicant has provided an improved drainage system for rain water flow from a down pipe or down spout of a building. Of of primary importance, it includes a drainage enclosure which is totally below terrain, and thus no obstruction is provided to lawn mowing activities around it. It enhances landscaping by eliminating unsightly above-ground blocks. Of further importance is the fact that the velocity of water flow is reduced as its cross section is increased, and as such, soil erosion and the ditches which typically result therefrom are effectively eliminated. Further, it eliminates the flooding of flower beds which may not only erode or wash away soil from flowers, but it prevents excessive watering of them. If the below-ground enclosure should require cleaning, this would involve lifting a top plate rather than a whole splash block. This is a relatively small chore. However, the assembly is self-flushing.

What is claimed is:

1. A drainage system, including an enclosure, and comprising:
   a generally horizontal base of said enclosure having an opening therein, which opening has an area small with respect to the balance of the area of said base;
   wall regions of said enclosure extending around and upward from said base to a generally flat upper edge and having a side entrance opening;
   a body of water-permeable material beneath said base;
   a generally flat cover member configured to be laterally and vertically supported on said upper edge of said wall regions and partially covering, from 20% to 60%, the inner top dimension of said enclosure;
   a drain pipe extending downward and having a generally L-shaped region curving downward from a generally vertical posture through a generally horizontal one, and said end being adapted to extend into said entrance opening in said wall regions;
   whereby water passing down through said drain pipe generally fills said enclosure and thereafter flows upward and then outward from said enclosure and is dispersed around said enclosure, and finally, residual water filling said enclosure passes down through said opening in said base and is dissipated.

2. A drainage system as set forth in claim 1 wherein said side regions include a recess formed in said upper edge, and said top member is positionable within said recess.

3. A drainage system as set forth in claim 2 wherein said cover member includes a series of spaced openings.

4. A drainage system as set forth in claim 3 wherein said entrance opening in said wall regions is adjacent to said base.

5. A drainage system as set forth in claim 3 wherein the periphery of said upper edge of said wall region is between 30" and 50".

6. A drainage system as set forth in claim 5 wherein the depth of said wall enclosure is between 4" and 10".

7. A drainage system as set forth in claim 6 wherein said opening in said base is from 1 to 3 square inches.

8. A drainage system as set forth in claim 7 wherein said wall regions are rectangular.

9. A drainage system as set forth in claim 7 wherein said wall regions are circular.

* * * * *